United States Patent
Fedulova et al.

(10) Patent No.: US 12,542,213 B2
(45) Date of Patent: Feb. 3, 2026

(54) DETERMINING A RELATIVE COGNITIVE CAPABILITY OF A SUBJECT

(71) Applicant: KONINKLIJKE PHILIPS N.V., Eindhoven (NL)

(72) Inventors: Irina Fedulova, Moscow (RU); Vladimir Groza, Moscow (RU)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 704 days.

(21) Appl. No.: 17/432,912

(22) PCT Filed: Feb. 24, 2020

(86) PCT No.: PCT/EP2020/054722
§ 371 (c)(1),
(2) Date: Aug. 21, 2021

(87) PCT Pub. No.: WO2020/173847
PCT Pub. Date: Sep. 3, 2020

(65) Prior Publication Data
US 2022/0189181 A1 Jun. 16, 2022

(30) Foreign Application Priority Data
Feb. 25, 2019 (RU) .............. RU2019105162

(51) Int. Cl.
*G06F 18/25* (2023.01)
*G06V 20/59* (2022.01)
(Continued)

(52) U.S. Cl.
CPC ........... *G16H 50/20* (2018.01); *G06F 18/256* (2023.01); *G06V 20/597* (2022.01);
(Continued)

(58) Field of Classification Search
CPC ........ G16H 50/20; G16H 50/30; G16H 10/60; G16H 40/20; G16H 40/63; G16H 50/70;
(Continued)

(56) References Cited

U.S. PATENT DOCUMENTS 10,538,259 B2 * 1/2020 Molne .................. B61L 27/20
10,765,380 B2 * 9/2020 Everman ................ A61B 5/746
(Continued)

FOREIGN PATENT DOCUMENTS

JP 2003373620 A 5/2005
JP 2010128649 A 6/2010
(Continued)

OTHER PUBLICATIONS

Healey, J. A. et al. "Detecting stress during real-world driving tasks using physiological sensors" IEEE Transactions on Intelligent Transportation Systems, 6(2), pp. 156-166 (2005). (Year: 2005).*
(Continued)

*Primary Examiner* — Ian L Lemieux

(57) ABSTRACT

A method and system for determining an indicator for a subject that is responsive to changes in a relative cognitive capability of that subject. At least two separate machine-learning algorithms are used to generate a respective number of intermediate indicators based on one or more outputs of one or more sensors monitoring the subject. The intermediate indicators are subsequently processed to thereby generate an indicator of a relative cognitive capability of the subject.

20 Claims, 3 Drawing Sheets

(51) Int. Cl.
*G06V 40/16* (2022.01)
*G16H 40/63* (2018.01)
*G16H 50/20* (2018.01)
*G16H 50/30* (2018.01)
*G06V 10/80* (2022.01)
*G06V 40/10* (2022.01)

(52) U.S. Cl.
CPC ........... *G06V 40/174* (2022.01); *G16H 40/63* (2018.01); *G16H 50/30* (2018.01); *G06V 10/80* (2022.01); *G06V 40/15* (2022.01)

(58) Field of Classification Search
CPC ........ G16H 20/00; A61B 5/168; A61B 5/163; A61B 3/113; A61B 5/0205; A61B 5/16; A61B 5/165; A61B 5/18; A61B 5/7264; A61B 5/746; B60W 2040/0827; B60W 40/08; B60W 2040/0836; B60W 2420/42; B60W 50/14; G06F 3/011; G06V 20/597; G06V 40/174; G06V 40/15; G06V 10/454; G06V 10/764; G06V 10/80; G06V 10/82; G06V 20/59; G06V 2201/02; G06V 40/179; G06T 2207/30268
See application file for complete search history.

(56) References Cited

U.S. PATENT DOCUMENTS

| | | | | |
|---|---|---|---|---|
| 10,783,801 | B1* | 9/2020 | Beaubien | G09B 5/06 |
| 10,877,444 | B1* | 12/2020 | Roach | A61B 5/7405 |
| 11,093,904 | B2* | 8/2021 | Humble | A61B 5/165 |
| 11,122,998 | B2* | 9/2021 | Martucci | G09B 7/00 |
| 11,141,088 | B2* | 10/2021 | Liu | G06N 3/045 |
| 11,249,544 | B2* | 2/2022 | Sicconi | G08B 3/1016 |
| 11,298,062 | B2* | 4/2022 | Ellison | G16H 50/20 |
| 11,715,564 | B2* | 8/2023 | Mellem | G16H 10/60 705/3 |
| 2015/0223743 | A1* | 8/2015 | Pathangay | A61B 5/18 600/509 |
| 2016/0090097 | A1 | 3/2016 | Grube et al. | |
| 2016/0262680 | A1* | 9/2016 | Martucci | A61B 5/4088 |
| 2016/0267405 | A1* | 9/2016 | Reiner | A61B 5/165 |
| 2018/0102047 | A1 | 4/2018 | Wilson | |
| 2018/0199877 | A1* | 7/2018 | Kukawka | G16H 50/20 |
| 2018/0220948 | A1 | 8/2018 | Kojima | |
| 2019/0019068 | A1 | 1/2019 | Zhu et al. | |
| 2019/0045020 | A1 | 2/2019 | Ein-Gil | |
| 2019/0216392 | A1* | 7/2019 | Bower | A61B 5/4088 |
| 2020/0008725 | A1* | 1/2020 | Bach | A61B 5/16 |
| 2020/0342979 | A1* | 10/2020 | Sadowsky | A61B 5/165 |
| 2021/0106290 | A1* | 4/2021 | Groleau | A61B 5/6801 |
| 2022/0095975 | A1* | 3/2022 | Aluf | B60W 60/0051 |
| 2022/0230522 | A1* | 7/2022 | Myers | A61B 5/18 |
| 2023/0280828 | A1* | 9/2023 | Fung | A63B 24/0087 |

FOREIGN PATENT DOCUMENTS

| | | |
|---|---|---|
| WO | 2015193806 A1 | 12/2016 |
| WO | 2017191227 A1 | 11/2017 |
| WO | 2018/168121 A1 | 9/2018 |

OTHER PUBLICATIONS

Benezeth et al: "Remote Heart Rate Variability for Emotional State Monitoring"; IEEE International Conference on Biomedical and Health Informatics, 2018, Las Vegas, NV, 5 Page Document.

De Naurois et al: "Detection and Prediction of Driver Drowsiness Using Artificial Neural Network Models"; Accident Analysis and Prevention, Elsevier Ltd, 2017, 10 Page Document.

PCT/EP2020/054722 ISR & Written Opinion, May 14, 2020, 14 Page Document.

Joshi et al: "A Brief Review of Facial Expressions Recognition System"; Asian Journal of Convergence in Technology, vol. 1V, Issue I, 2015, 4 Page Document.

Ko: "A Brief Review of Facial Emotion Recognition Based on Visual Information"; Sensors, 2018, 20 Page Document.

Krupinski: "Fatigue in Radiology: What is Its Impact and What Can Be Done?" Radiology Business Journal, Feb. 2017, 9 Page Article.

Philips: Licensing:Vital Signs Camera, 4 Page Document, 2018.

Salman et al: "Artificial Intelligence in Bio-Medical Domain: An Overview of AI Based Innovations in Medical"; International Journal of Advanced Computer Science and Applications, vol. 8, No. 8, 2017, pp. 319-327.

Solaz et al: "Drowsiness Detection Based on the Analysis of Breathing Rate Obtained From Real-Time Image Recognition"; Transportation Research Procedia 14 (2016), pp. 3867-3876.

* cited by examiner

DETERMINING A RELATIVE COGNITIVE CAPABILITY OF A SUBJECT

CROSS-REFERENCE TO PRIOR APPLICATIONS

This application is the U.S. National Phase application under 35 U.S.C. § 371 of International Application No. PCT/EP2020/054722, filed on Feb. 24, 2020, which claims the benefit of European Patent Application No. 2019105162, filed on Feb. 25, 2019. These applications are hereby incorporated by reference herein.

FIELD OF THE INVENTION

The present invention relates to concepts for determining a relative cognitive capability of a subject.

BACKGROUND OF THE INVENTION

There has been a growing interest in ensuring that subjects are able to perform intellectual tasks to the best of their capabilities. This is particularly important in a clinical setting, where cognitively-impaired clinicians are more likely to inaccurately diagnosis or otherwise analyze a patient, directly leading to negative patient outcomes. This may be due to cognitively impaired clinicians overlooking or misidentifying potentially important findings when reviewing a patient or a medical image.

There is therefore a desire to identify or quantify a change in cognitive capability, to thereby identify when it is likely that an intellectual task will be inaccurately performed. This would help avoid avoidable mistakes being made by a subject performing an intellectual task, such as diagnosing.

Presently, subjects are asked to consciously monitor changes in their cognitive capabilities themselves, e.g. by self-assessing a level of their fatigue, in order to prompt the subject to modify their working procedure or to take a break to prevent inaccurate performance of a technical task. However, such measures are subjective and can therefore be inaccurate and/or inconsistent. This could lead to outcomes of intellectual tasks performed by that subject being inaccurate, e.g. inaccurate diagnosis of a patient.

There is therefore a technical desire to accurately generate a non-subjective indicator of a subject's relative cognitive capability or changes thereto, in order to assess possible impairments to the subject's ability to perform a cognitive task and therefore predict an accuracy of the outcome of the cognitive task.

By ensuring that an accurate indicator of a subject's relative cognitive capability is increased, there is a reduced likelihood that an error of a subject will go unnoticed or that a subject will continue to perform an intellectual task. In addition, potential errors can be flagged for later review.

SUMMARY OF THE INVENTION

The invention is defined by the claims.

According to examples in accordance with an aspect of the invention, there is provided a method of generating an output indicator of a relative cognitive capability of a monitored subject. The method comprises: obtaining at least one output from at least one sensor monitoring a subject and/or the subject's environment; processing the at least one output using a first machine-learning algorithm, to thereby generate a first intermediate indicator of either a factor able to impair a subject's relative cognitive capability or a characteristic affected by impairments to a subject's relative cognitive capability; processing the at least one output using a second, different machine-learning algorithm, to thereby generate a second, different intermediate indicator of either a factor able to impair a subject's relative cognitive capability or a characteristic affected by impairments to a subject's relative cognitive capability; and processing the first and second intermediate indicators to thereby generate an output indicator of the subject's relative cognitive capability.

Thus, a proposed method comprises generating at least two intermediate indicators for respective factors that could affect or are affected by a subject's relative cognitive capability and subsequently generating an indicator of the subject's relative cognitive capability based on these intermediate indicators. Different machine-learning algorithms are used to generate the different intermediate indicators.

Thus, a subjective measure of relative cognitive capability is replaced by a more accurate, machine-learning based method of generating an indicator of relative cognitive capability. Accurate generation of an indicator of the subject's relative cognitive capability is important to assess an accuracy or effectiveness of the subject's intellectual work.

By using separate machine-learning algorithms to generate different intermediate indicators, the accuracy of the output indicator provided by the proposed method is improved. Identifying changes in cognitive capability is a difficult and complex task, and the inventors have recognized that separately determining different aspects (intermediate indicators) that contribute to a relative cognitive capability increases the accuracy of determining a relative cognitive capability, as each intermediate indicator can, by itself, be accurately identified and machine-learning algorithms can be specifically trained for each intermediate indicator.

Thus, the proposed concept provides a method adapted specifically for determining a subject's relative cognitive capability that takes account of the difficulties in assessing a cognitive capability of the subject.

The output indicator indicates a level or measure of the subject's relative cognitive capability. Thus, changes to the output indicator are indicative of changes to a level of the subject's relative cognitive capability. A relative cognitive capability may be a measure of the likelihood that the subject will accurately or successfully perform an intellectual task, e.g. relative to a scenario in which there were no factors affecting their cognitive capability. An intermediate indicator is an indicator of a factor affecting or affecting by changes to cognitive capability.

Preferably, the step of processing the first and second intermediate indicators comprises processing the first and second intermediate indicators, using a third, different machine-learning algorithm, to generate the output indicator of a level of the subject's relative cognitive capability. Use of a machine-learning algorithm enhances the accuracy of the indicator.

In at least one embodiment, the output indicator is presented to a subject, e.g. via a user interface. The output indicator assists the subject in performing an intellectual technical task (e.g. diagnosing a patient), as the subject will be made aware of their relative intellectual impairment when performing the task. By continually monitoring the presented output indicator, the subject can keep track of their output indicator, and thereby determine how accurately they will perform the task (e.g. to modify their behavior in response to the relative cognitive capability or to change their environment). The ability to monitor a relative cognitive capability of a subject can be used to prevent inaccurate performance of an intellectual task caused by reduced cognitive capability (such as a diagnosis task), and thereby improve the confidence and reliability of a performance of the intellectual task. Thus, the presented output indicator enables a user to perform a technical task of assessing their capability of performing the intellectual task and thereby improving the performance of the intellectual task.

In embodiments, the at least one sensor comprises at least two sensors, and the at least one output comprises at least one output from each sensor. The use of more than one sensor increases the accuracy of the output indicator, and provides improved redundancy in the system. As cognitive capability is a complex factor to assess, it has been recognized that using only a single sensor or single signal can lead to poor accuracy, so that use of multiple sensors when determining relative cognitive capability leads to improved accuracy.

For example, pulse-based (i.e. heart-rate) detectors may not work for trained athletes, because there will be no or limited changes in pulse. Thus, relying on a single (pulse) sensor would not result in an accurate assessment of a change in relative cognitive capability). Similarly, signals from EEG based detectors may be processed to accurately determine relative cognitive capability, but are only reliable and/or accurate when they capture good signal quality. If contact between electrodes and a subject's scalp is bad, quality of the overall EEG based detector may be degraded, and the sensor data may therefore be unreliable. As another example, a subject may be distracted by some external events or noise (causing a decline in their relative cognitive capability), which distraction would be missed by physical based detectors (such as heart rate monitors).

In other words, relying on a single sensor means that any noise, damage or insensitivity (e.g. to a particular subject or factor affecting or affected by cognitive capability) of that sensor significantly reduces an accuracy of determining the relative cognitive capability of the subject. Thus, using more than one sensor provides a method of assessing a relative cognitive capability that is more robust to noise, damage and subject variability.

The two or more sensors preferably comprise two or more different sensors, adapted to monitor different parameters of the subject.

In some embodiments, the step of processing the at least one output using a first machine-learning algorithm comprises processing an output of a first sensor using a first machine-learning algorithm to thereby generate the first intermediate indicator; and the step of processing the at least one output using the second machine-learning algorithm comprises processing an output of a second, different sensor using the second machine-learning algorithm to thereby generate the second intermediate indicator.

Thus, outputs of different sensors may be processed by different intermediate machine-learning algorithms to generate the different intermediate indicators. Thus, each intermediate indicator may be independent of the other intermediate indicator, and each associated with a different sensor. In particular embodiments, the first machine-learning algorithm does not receive input from the second sensor and the second machine-learning algorithm does not receive input from the first sensor.

The first and second machine-learning algorithms are preferably trained independently from one another. Thus, existing machine-learned algorithms can be implemented in the system, enabling highly accurate identification of the intermediate indicators. In particular, machine-learning algorithms that are not dedicated to the environment in which the method is employed can be utilized, thereby increasing an ease of training machine-learning algorithms and expanding the availability of data for training the algorithms that generate the intermediate indicators.

The output indicator may comprise a measure of a subject's relative cognitive capability. A measure of a subject's relative cognitive capability indicates a cognitive capability relative to a "normal" or "baseline" cognitive capability of that subject. A normal or baseline cognitive capability may represent a cognitive capability of the subject when they are not impaired by cognitive-affecting factors (such as emotional state, stress level or environmental distractions).

The method may further comprise processing the output indicator to determine whether the relative cognitive capability of the subject is below a predetermined threshold; and in response to determining that the relative cognitive capability of the subject is below the predetermined threshold, generating an alert. By generating an alert, poor cognitive capability of the subject can be recognized or drawn to an entity's (e.g. the subject's or another person's) attention.

The step of generating an alert may comprise generating a user perceptible output via a user interface. By alerting the user to their own deterioration in their cognitive capability, the user can be prompted to take a break, thereby reducing the likelihood that future intellectual tasks will be performed inaccurately.

There is also proposed a method of operating a user terminal adapted to receive a user input representing an outcome of an intellectual task performed by a subject, the method comprising: performing any described method of generating an output indicator; and flagging the user input provided by the subject based on the output indicator.

There is proposed another method of operating a user terminal adapted to receive a user input representing an outcome of an intellectual task performed by a subject, the method comprising: performing any described method of generating an output indicator; processing the output indicator to determine whether a relative cognitive capability of the subject is below a predetermined threshold; and in response to determining that the relative cognitive capability of the subject is below the predetermined threshold, preventing the subject from providing a user input.

There may be more than one predetermined threshold, each of which is associated with performing a different task (e.g. generating an alert, preventing the subject from providing a user input, alerting another subject, preventing the subject's user inputs from being saved or received by another device, changing a flag on a user input and so on).

Preferably, the monitored subject is a clinician, and the intellectual task is a task of assessing or diagnosing medical images of subjects.

There is also proposed a computer program comprising code means for implementing any described method when said program is run on a computer.

According to examples in accordance with an aspect of the invention, there is provided a system for determining a relative cognitive capability of a monitored subject. The system comprises an input interface adapted to obtain at least one output from at least one sensor monitoring a subject and a processing system. The processing system is adapted to: process the at least one output using a first machine-learning algorithm, to thereby generate a first intermediate indicator of either a factor able to impair a subject's relative cognitive capability or a characteristic affected by impairments to a subject's relative cognitive capability; process the at least one output using a second, different machine-learning algorithm, to thereby generate a second, different intermediate indicator of either a factor able to impair a subject's relative cognitive capability or a characteristic affected by impairments to a subject's relative cognitive capability; process the first and second intermediate indicators to thereby generate an output indicator of the subject's relative cognitive capability There is also proposed a user terminal for a computing system, the user terminal comprising: an input user interface adapted to receive a user input representing an outcome of an intellectual task performed by a subject; and the system previously described, wherein the system is further adapted to flag the user input provided by the subject based on the output indicator.

There is proposed another user terminal for a computing system, the user terminal comprising: an input user interface adapted to receive a user input representing an outcome of an intellectual task performed by a subject; and the system previously described, the system being further adapted to process the output indicator to determine whether a relative cognitive capability of the subject is below a predetermined threshold; and in response to determining that the relative cognitive capability of the subject is below the predetermined threshold, prevent the subject from providing the user input.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
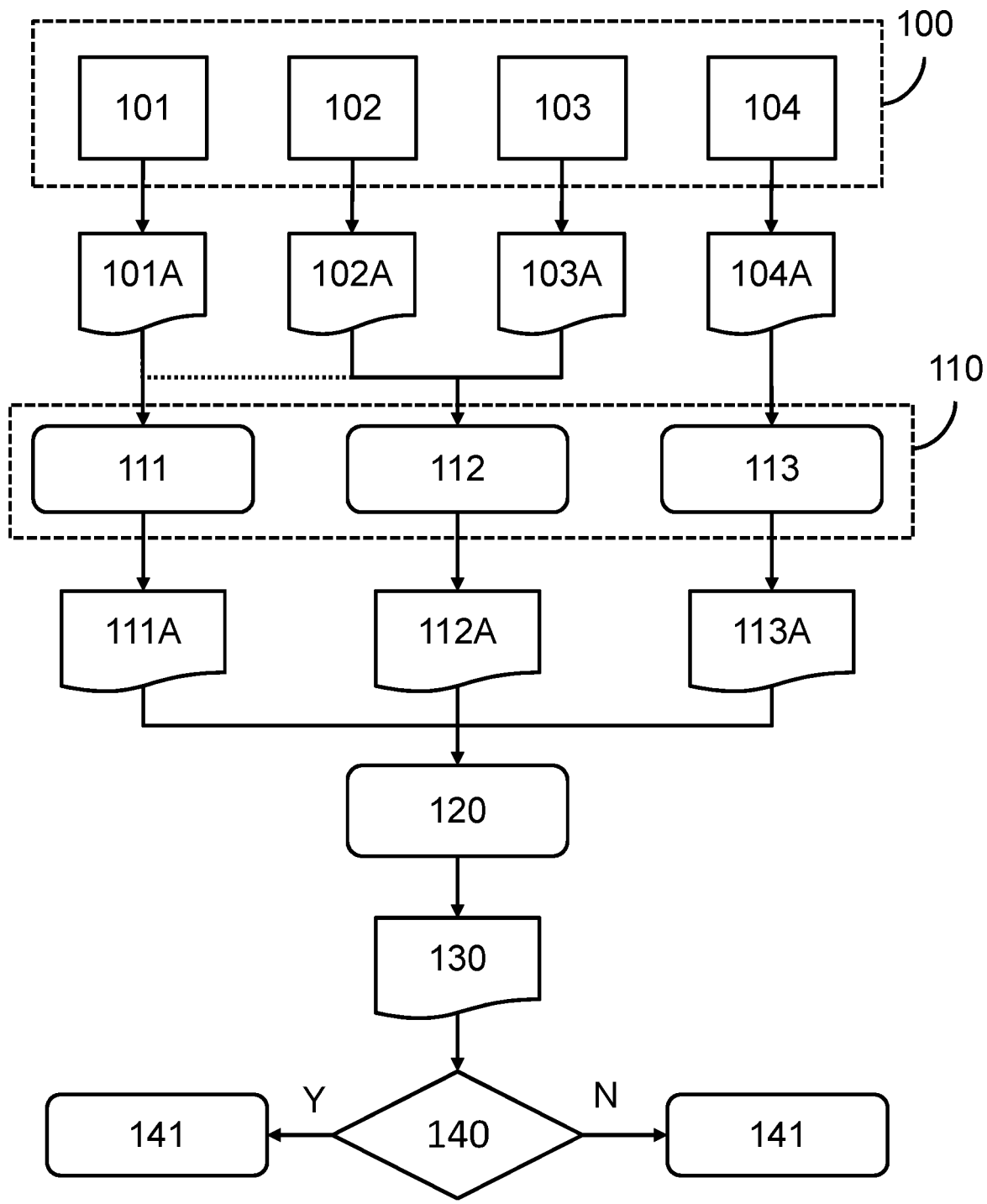
FIG. 1 conceptually illustrates an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

According to a concept of the invention, there is proposed a concept for determining an indicator for a subject that is responsive to changes in a relative cognitive capability of that subject. At least two separate machine-learning algorithms are used to generate a respective number of intermediate indicators based on one or more outputs of one or more sensors monitoring the subject. The intermediate indicators are subsequently processed to thereby generate an indicator of a relative cognitive capability of the subject.

Embodiments are at least partly based on the realization that directly determining a relative cognitive capability of a subject using sensor information is a complex and unreliable task, due to the complex and difficult to predict nature of cognition. It is proposed to use separate machine-learning algorithms to accurately generate intermediate indicators, which can in turn be used to generate an indicator of relative cognitive capability. Thus, machine-learning algorithms can be specifically trained for performing a particular, less-complex task (e.g. generating an indicator of fatigue or attention), the result of which is used to determine relative cognitive capability.

Illustrative embodiments may, for example, be employed in a medical setting to monitor a clinician performing analysis of medical images (e.g. to diagnose a patient). This allows the clinician to be alerted when their performance has dropped or permits the clinician's analysis to be flagged if it may require additional review.

FIG. 1 schematically illustrates a high-level outline of an embodiment for the purposes of contextual understanding. Concepts described with reference to FIG. 1 may be appropriately adapted for any envisaged embodiment and clarifications to terminology apply across the entirety of this description.

Each of a set 100 of (one or more) sensors 101, 102, 103, 104 is adapted to monitor a subject (not shown) to generate an output 101A, 102A, 103A, 104A comprising monitored values of the subject and/or their environment. Examples of appropriate sensors include: video cameras, vital sign monitors (e.g. pulse oximeters, vital signs cameras, blood pressure cuffs, subject temperature monitors and so on); an electroencephalogram (EEG) system (e.g. comprising a headset of electrodes); an electrocardiogram (ECG) monitor (e.g. comprising an array of chest electrodes); workstation usage monitors; environment noise monitors; environment temperature monitors; ambient light monitors and so on.

A set 110 of two or more machine-learning algorithms 111, 112, 113 are each adapted to process at least one output from the set 100 of sensors to generate a respective intermediate indicator 111A, 112A, 113A. A machine-learning algorithm 111, 112, 113 may, for example, process a sample or set of samples (e.g. across a period of time) of at least one output of the sensor(s) to thereby produce an intermediate indicator. Thus, more than one intermediate indicator is generated from at least one output of at least one sensor monitoring a subject.

Each machine-learning algorithm 111, 112, 113 is preferably trained independently of the others (e.g. in separate controlled experiments), and may be trained outside of the setting in which the overall system is used. This improves a flexibility of the method to adapt to different specialized machine-learning training algorithms.

An intermediate indicator 111A, 112A, 113A indicates a level or measure of any factor that could affect the subject's ability to accurately or successfully perform an intellectual task (i.e. any factor that could impair a subject's cognitive capability) or a level/measure of any characteristic that is affected by impairments to the subject's cognitive capability.

Examples of suitable factors that could affect/impair a subject's cognitive capability include: a distraction level; an attention level; a stress level; an emotional state; and a level of fatigue; significant environmental noise or temperature. Examples of suitable characteristics that could be affected/impaired by an impairment to a subject's cognitive capability include anomalies in a work performance by the subject, errors in the subject's performance of an intellectual task and so on.

Thus, examples of suitable intermediate indicators include: a measure of a subject's level of fatigue; a measure of a subject's attention level; a measure of a subject's stress level; an emotion of the subject; an indication of a usage pattern anomaly by the subject; an indication of a significant change in temperature/noise in a subject's environment.

The intermediate indicator may be indicate a change to or a difference from a normal or "baseline" level of the subject, i.e. a "relative measure". For example, an intermediate indicator may include: a measure of a deviation of a subject's level of fatigue from a baseline level of fatigue; a measure of a deviation of a subject's level of fatigue from a baseline level of fatigue and so on. As another example, an intermediate indicator may indicate when a measure of a subject or their environment is outside a normal or expected range.

A baseline level can be determined by monitoring a subject in a controlled "normal" state: e.g. in the morning, when not tired, after responding to the basic test questions and perhaps even after a physician's review of the subject. During the controlled monitoring, it may be guaranteed that no external distracting events happen, e.g. another person may be responsible for confirming that nothing happened. This baseline recording session is required only once for every person, or at periodic intervals, e.g. every 6 months or every 12 months. The models of the monitoring system can remember the "normal" state of this subject and use anomaly detection techniques to flag deviating cases as outliers.

Various supervised and unsupervised anomaly detection techniques can be used to identify significant deviations from the baseline levels could be used. For example, density-based techniques, e.g. k-nearest neighbor or local outlier factor can be used to identify data points that are far away from the normal distribution. If a particular sensor is providing a time series, ARIMA or exponential smoothing may be useful for detecting outlier data points.

For example, a first machine-learning algorithm 111 may determine an emotion of the subject 111A based on a video stream or image 101A obtained from a video camera 101 monitoring a face of the subject. The skilled person would be readily capable of implementing an emotion recognition methodology using their common general knowledge, for example, employing a methodology set out in Ko, B.C. "A Brief Review of Facial Emotion Recognition Based on Visual Information", Sensors 2018, 18, 401.

As another example, a second machine-learning algorithm 112 may generate a measure 112A of the subject's stress or attention level. The second machine-learning algorithm 112 may process outputs 102A, 103A of a vital signs monitor 102 and/or an electroencephalogram system 103 to determine a stress/attention level. Thus, the second-machine-learning algorithm may determine a stress/attention level of the subject based on physiological indicators 102A, 103A, such as pulse rate, heart rate (variability), body temperature, breathing rate, brain activity and so on. A suitable machine-learning algorithm can be employed and trained to determine a stress/attention level based on such input parameters.

As yet another example, another machine-learning algorithm 113 may detect unusual or anomalous usage patterns 113A (e.g. of a user terminal, computer or other input mechanism) by the subject. Accordingly, the usage pattern detector 113 may receive input from a usage monitoring system 104 adapted to monitor usage characteristics 104A of a user terminal by the subject. A suitable machine-learning algorithm can be employed and trained to determine anomalous usage 113A based on a monitored usage 104A.

The usage monitoring system may monitor, for example, mouse clicks, opening times/delays of data/documents, average number of documents reviewed within a set time period, mean time spent reviewing a document or dataset, times or time taken to upload/download information from a data base and deviations from any of the aforementioned. For example, irregular pauses in the workflow or non-usual time spent on a particular document may indicate that subject's workflow is being interrupted by some factors. This is analogous to some driver's drowsiness detection systems, where changes or deviations in steering pattern is used to detect if the driver is falling asleep, e.g. as set out in de Naurois, Charlotte Jacobé, et al. "Detection and prediction of driver drowsiness using artificial neural network models." Accident Analysis & Prevention (2017). The skilled person would be capable of adapting such systems to monitor user terminal usage, rather than steering parameters. Of course, in some examples employed in a vehicle, the usage monitoring system monitors steering parameters for a vehicle, e.g. as set out in de Naurois et al.

The intermediate indicators 111A, 112A, 113A are then processed in a step 120 to generate an output indicator 130 of the subject's relative cognitive capability. In particular embodiments, step 120 may comprise processing the intermediate indicators using a third (different) machine-learning algorithm.

In particular, the output indicator 130 indicates a level of the subject's relative cognitive capability. Thus, changes to the output indicator are indicative of changes to a level of the subject's relative cognitive capability. A relative cognitive capability may be a measure of the likelihood that the subject will accurately or successfully perform an intellectual task, e.g. relative to a scenario in which there were no factors affecting their cognitive capability.

Thus, for example, the output indicator may be a predicted probability that the subject will erroneously perform an intellectual task ("human error probability") or a numerical measure of a subject's relative cognitive capability (e.g. expressed as a percentage). In other examples, the indicator is a categorical indicator (e.g. values representing "Highly Impaired", "Slightly Impaired" or "Not Impaired") or a binary indicator (e.g. an indicator of whether or not it is predicted that the subject's cognitive capability has been impaired or not).

In other words, a plurality of intermediate indicators 111A, 112A, 113A (each generated by a respective machine-learning algorithm) are thereby processed in step 120 to generate a single output indicator 130. This may be performed, for example, by using a weighted sum passed through a sigmoid function or may comprise, as previously described, processing the intermediate indicators using another machine-learning algorithm.

In particular, the output indicator may indicate a change to or a difference from a normal or "baseline" level of the subject, i.e. a "relative measure".

As before, a baseline level can be determined by monitoring a subject in a controlled "normal" state: e.g. in the morning, when not tired, after responding to the basic test questions and perhaps even after a physician's review of the subject. During the controlled monitoring, it may be guaranteed that no external distracting events happen, e.g. another person may be responsible for confirming that nothing happened. This baseline recording session is required only once for every person, or at periodic intervals, e.g. every 6 months or every 12 months. The models of the monitoring system can remember the "normal" state of this subject and use anomaly detection techniques to flag deviating cases as outliers.

Thus, a machine-learning algorithm may be trained to recognise a normal or baseline level of the subject (e.g. based on baseline intermediate indicators), and recognise significant deviation from baseline level. Various supervised and unsupervised anomaly detection techniques can be used to identify significant deviations from the baseline levels could be used. For example, density-based techniques, e.g. k-nearest neighbor or local outlier factor can be used to identify data points that are far away from the normal distribution. Other suitable machine-learning algorithms (e.g. neural networks) are described later.

Whilst the above illustrated system uses three separate machine-learning algorithms 111, 112, 113 to generate three separate intermediate indicators 111A, 112A, 113A, it will be appreciated that any number of (two or more) machine-learning algorithms can be used to generate a respective plurality of (two or more) intermediate indicators for use in determining the output indicator in step 120.

Of course, a given machine-learning algorithm 111, 112, 113 may use more than one output of one or more sensors 101A, 101B, 101C, 101D to generate the intermediate indicators. For example, as illustrated, the second machine-learning algorithm 112 may use two outputs 102A, 103A of the sensors to generate the second intermediate indicator 112A.

Preferably, there are a plurality of sensors, each producing at least one respective output, which outputs are used by the machine-learning algorithms to generate respective intermediate indicators. In this way, information from several sensors can be combined to generate a plurality of intermediate indicators. Using more than one sensor during generation of the output indicator increases the accuracy of the output indicator, as potential errors of a given sensor (e.g. giving false readings) can be mitigated, i.e. effectively providing redundancy.

An output of a sensor may be shared between different machine-learning algorithms when generating the different intermediate indicators. Thus, different machine-learning algorithms may use a same output of a same sensor when generating different intermediate indicators. By way of example, an output of the video camera may be provided to the second machine-learning algorithm 112, e.g. as the number and frequency of eye blinks can indicate a stress/attention level.

Preferably, different machine-learning algorithms use different selections or subsets of the outputs generated by the plurality of sensors to generate a respective intermediate indicator. Thus, each of the two or more machine-learning algorithms may use a unique set of the output(s) from the sensor(s) to generate a respective intermediate indicator.

Thus, for example, the first machine-learning algorithm may process an output of a first sensor to thereby generate the first intermediate indicator, and the second machine-learning algorithm may process an output of a second, different sensor to thereby generate the second intermediate indicator. In this example, the first machine-learning algorithm may not use the output of the second, different sensor (used by the second machine-learning algorithm) and the second machine-learning algorithm may not use the output of the first sensor (used by the first machine-learning algorithm).

In preferable embodiments, each machine-learning algorithm 110 generating an intermediate indicator does not process an output of at least one sensor. This helps reduce the impact of a faulty or insensitive sensor on the output indicator, improving a reliability of the overall system.

One or more of the outputs of the sensors may be pre-processed before being provided as input to a machine-learning algorithm 110. For example, the video camera data 101A may be processed to determine certain characteristics of the patient to be used as input to a machine-learning algorithm (e.g. a color of the subject, a breathing rate of the subject, a number/frequency of eye blinks and so on). In other embodiments, such pre-processing forms part of the machine-learning algorithm 110.

In some embodiments, the output indicator 130 may be further processed in a step 140. The step 140 may processing the output indicator to determine whether the relative cognitive capability of the subject is below a predetermined threshold.

The precise operation of step 140 may depend upon the implementation details of the output indicator. For example, where the output indicator is a measure of the relative cognitive capability, step 140 may comprise determining whether the measure itself is below a predetermined threshold. In another example, where the output indicator is a categorical measure (e.g. "Highly Impaired", "Slightly Impaired" or "Not Impaired"), certain categories (e.g. "Highly Impaired" or "Slightly Impaired") may be associated with a relative cognitive capability being below a predetermined threshold, so that step 140 comprises determining whether the output indicator lies in one of these categories.

In response to step 140 determining Y that the relative cognitive capability of the subject is below a predetermined threshold, then a step 141 of generating an alert may be performed. Step 141 may alternatively or additionally comprise performing a certain action.

In response to step 140 determining Y that the relative cognitive capability of the subject is not bellow a predetermined threshold, then a step 142 of not generating an alert may be performed. Step 142 may alternatively or additionally comprise not performing the certain action.

An alert may be a signal (e.g. electronic signal) used to initiate an action or task, e.g. displaying a user-perceptible alert such as a haptic, audio and/or visual output to a subject.

The alert may be provided to the monitored subject (e.g. via a user-perceptible output provided at a user interface), used to flag an activity performed by the monitored subject (e.g. for later review), passed to another subject (e.g. the subject's supervisor) or initiate a process for preventing the monitored subject from further carrying out an intellectual task (e.g. stop the subject providing further input for a monitored task). Thus, generating an alert may initiate a task or action. In other words, determining whether a relative cognitive capability is above or below a predetermined threshold may determine whether or not a particular task is performed.

In some embodiments, there may be more than one predetermined threshold associated with different alerts or actions. For example, a first predetermined threshold may provide an alert to the subject, e.g. via a user-perceptible output whereas a second predetermined threshold may initiate an action (e.g. via a different alert or alert signal) of preventing the monitored subject from further carrying out an intellectual task (e.g. preventing a user from inputting data and so on). In such an embodiments, the first predetermined threshold may represent a first level of relative cognitive capability and the second predetermined threshold may represent a second, lower level of relative cognitive capability. The different thresholds may be associated with any usage for an alert previously described.

In embodiments, alerts/actions may be grouped, and different groups of one or more alerts/actions may be associated with different predetermined thresholds.

To determine the predetermined threshold(s), there may be a calibration step in which a cognitive capability of the subject is determined at an initial point in time (e.g. at the beginning of a work day or a start of the subject's employment). This information may be used to tune or tailor the machine-learning algorithms 110 to a particular subject.

Of course, there may be a feedback mechanism in which a subject responds to the alert (e.g. indicating that it is a false alert), for instance via an input user interface. This information may be fed back into the system and used to modify the step 120. This ensures that the system is automatically adapted over time.

In other words, the subject may be able to override an alert or action initiated by the proposed method. In some embodiments, the system/method is adapted to generate a further alert (e.g. to trigger a notification to another subject, such as a subject's supervisor) indicating that an override has occurred. This helps prevent potentially dangerous overrides from going unnoticed.

The skilled person would readily be capable of implementing a system and method for carrying out the concept described with reference to FIG. 1. Nonetheless, for the sake of completion, respective embodiments for such a system and method are described with reference to FIGS. 2 and 3. These embodiments may be appropriately adapted to incorporate any optional feature described above.

Figure 2:
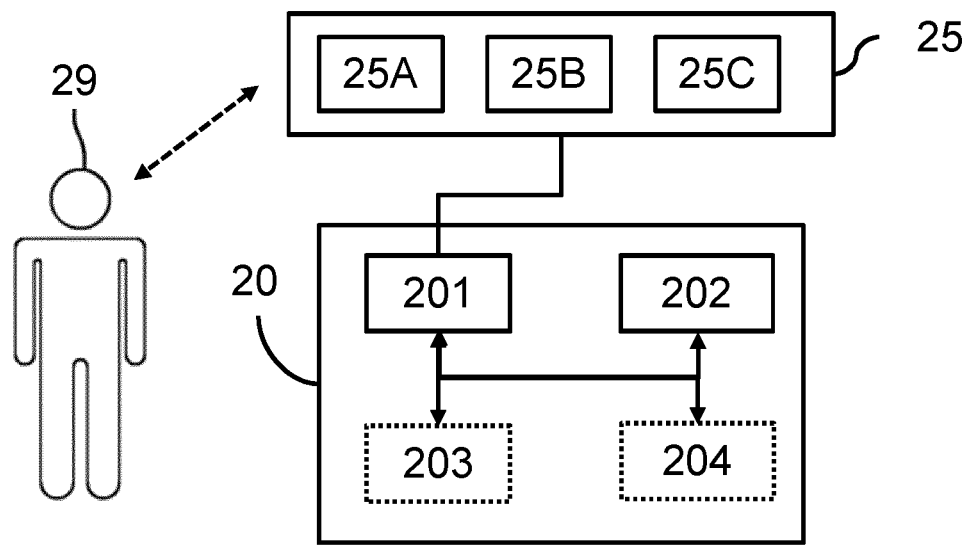
FIG. 2 illustrates a system according to an embodiment of the invention.

FIG. 2 illustrates a system 20 according to an embodiment of the invention. The system 20 comprises at least an input interface 201 and a processing system 202.

The input interface 201 is adapted to obtain at least one output from at least one sensor 25A, 25B, 25C monitoring a subject 29. Thus, a set 25 of sensors provides one or more outputs to be received by the input interface 201.

Of course, in some embodiments the sensors 25 form part of the system 20. Preferably, some (or, even more preferably, all) of the sensors are non-invasive, non-impeding and/or non-contacting sensors (such as videos cameras, vital sign cameras, environment monitors and the like).

The processing system 202 is adapted to process the at least one output using a first machine-learning algorithm, to thereby generate a first intermediate indicator of either a factor able to impair a subject's relative cognitive capability or a characteristic affected by impairments to a subject's relative cognitive capability.

The processing system 203 is also adapted to process the at least one output using a second, different machine-learning algorithm, to thereby generate a second, different intermediate indicator of either a factor able to impair a subject's relative cognitive capability or a characteristic affected by impairments to a subject's relative cognitive capability.

The processing system 202 is also adapted to process the first and second intermediate indicators to thereby generate an output indicator of the subject's relative cognitive capability.

Thus, as previously explained, the processing system 202 uses two or more separate machine-learning algorithms to generate a respective two or more intermediate indicators. The processing system 202 then uses the two or more intermediate indicators to generate an output indicator of the monitored subject's relative cognitive capability. This may be performed using a third machine-learning algorithm.

The system 20 may further comprise a user interface 203 adapted to provide the output indicator to the subject. The user interface 203 may be adapted to provide a visual, audio or haptic (e.g. vibration) output providing the output indicator to the subject.

The processing system may be further adapted to process the output indicator to determine whether to generate an alert. The processing may comprise processing the output indicator to determine whether the relative cognitive capability of the subject is below a predetermined threshold. In response to determining that the relative cognitive capability of the subject is below a predetermined threshold, then an alert can be generated (or another action performed). Embodiments may use more than one predetermined threshold, each defining when a particular actions is performed or a particular alert is generated.

In embodiments, the user interface may provide information on an alert, e.g. by providing a particular visual, audio and/or haptic output indicating that an alert has been issued. This thereby helps assist the subject in performing an intellectual technical task by alerting them when their cognitive capability has fallen below a threshold (e.g. and they therefore may not be able to perform the technical intellectual task to a suitable level).

Figure 3:
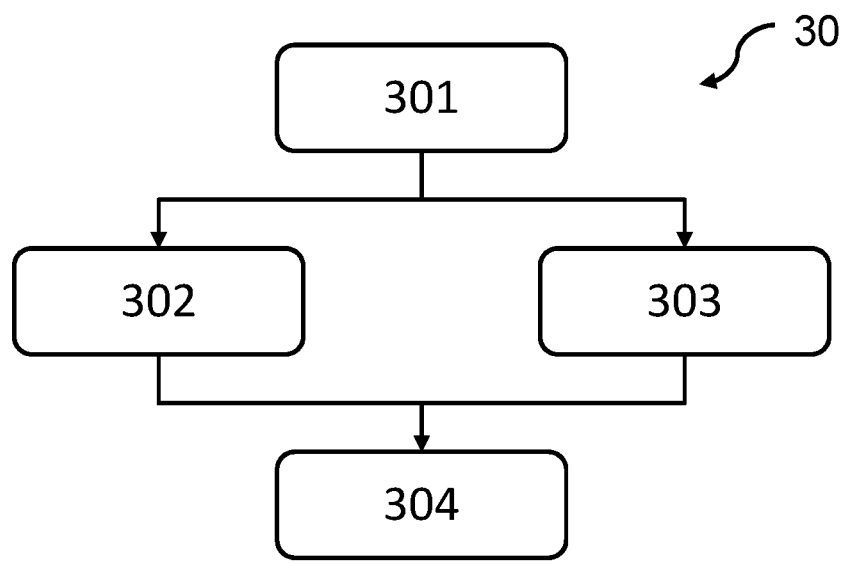
FIG. 3 illustrates a method according to an embodiment of the invention.

FIG. 3 illustrates a method 30 according to an embodiment of the invention.

The method comprises a step 301 of obtaining at least one output from at least one sensor monitoring a subject.

The method 30 then performs a step 302 of processing the at least one output using a first machine-learning algorithm, to thereby generate a first intermediate indicator of either a factor able to impair a subject's relative cognitive capability or a characteristic affected by impairments to a subject's relative cognitive capability.

The method also performs a step 303 of processing the at least one output using a second, different machine-learning algorithm, to thereby generate a second, different intermediate indicator of either a factor able to impair a subject's relative cognitive capability or a characteristic affected by impairments to a subject's relative cognitive capability.

Steps 302 and 303 may be carried out in parallel or sequentially.

Subsequently, the method 30 performs a step 304 of processing the first and second intermediate indicators to thereby generate an output indicator of the subject's relative cognitive capability.

Figure 4:
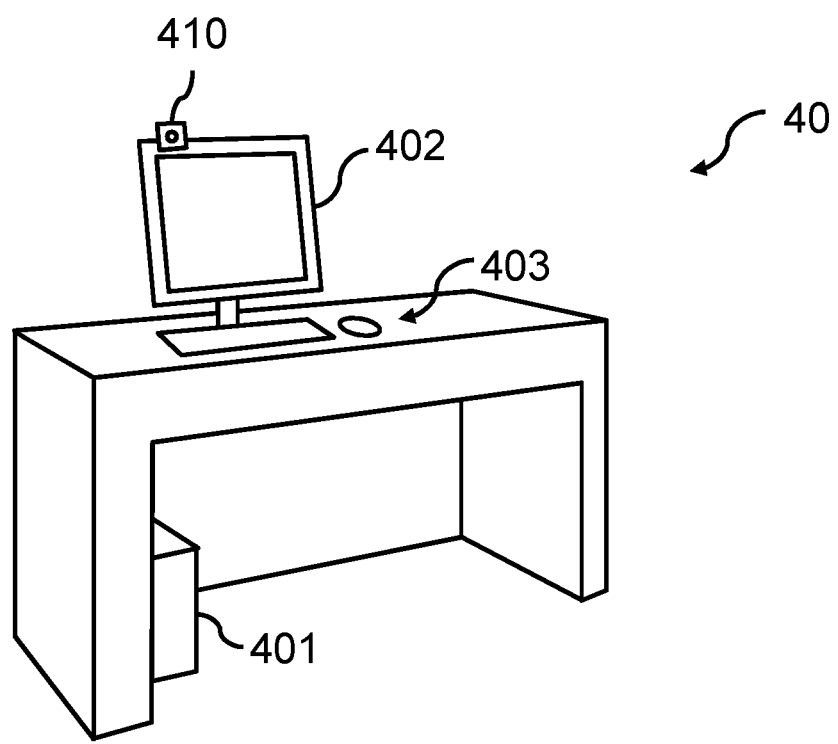
FIG. 4 illustrates a user terminal employing a system according to an embodiment of the invention.

FIG. 4 illustrates a user terminal 40 according to an embodiment of the invention. The user terminal 40 is adapted for use by a subject, here a clinician (e.g. radiologist), for reviewing medical images.

The user terminal comprises a computer system 401. The computer system 401 is connected to a display 402 (or other output user interface) and an input user interface 403 (e.g. a mouse and/or keyboard). The computer system 401 controls the display 402 so as to provide different medical images for review by the clinician. The computer system 401 receives input from the clinician, via the input user interface, such as symbolic, textual and/or pictorial comments of the clinician concerning the displayed medical image. The clinician is thereby able to perform a technical intellectual task of reviewing displayed medical images to provide comments, e.g. indicating a diagnosis of the patient associated with the medical image or flagging areas for further review.

The computer system 401 comprises a system for generating an output indicator of the subject's (clinician's) relative cognitive capability. The system 401 may be formed in any manner previously described.

In particular, one or more sensors 410 may provide sensor outputs to be processed by two or more separate machine-learning algorithms used by the system to generate intermediate indicators, which are in turn processed to generate the output indicator as previously described. The one or more sensors 410 may comprise a video camera (as illustrated) and/or a usage detection system (e.g. incorporated in the computer system) to detect anomalous usage patterns of the clinician.

In this way, the user terminal 40 can accurately monitor the relative cognitive capability of the subject using the user terminal.

The user terminal may be further adapted to flag inputs received from the clinician if the determined relative cognitive capability of the clinician is below a predetermined threshold. This enables potentially erroneous comments of the user to be identified (e.g. for further review).

In other embodiments, the user terminal may be adapted to prevent the clinician from providing further user input (via the input user interface) in response to the output indicator indicating that the relative cognitive capability of the clinician has dropped below a predetermined threshold. This may be performed by, for example, locking the user terminal to prevent the user providing further input, or disregarding inputs received from the clinician for a period of time. This prevents a user from providing an input (i.e. recording the result of their intellectual task) if it is decided that their relative cognitive capability is below a predetermined threshold.

In yet other embodiments, the user terminal may be adapted to assign a confidence level for a user input based on the output indicator. This can enable user inputs to be flagged for further review.

In yet another example, a message or alert may be sent to another subject or person, such as a supervisor of the monitored subject or another subject on duty, if the determined relative cognitive capability of the subject falls below the predetermined threshold.

The subject may be able to override an action performed by the user terminal (e.g. locking of the user terminal), e.g. using an appropriate user input. In embodiments, the user terminal is adapted to generate and send an alert to another subject, such as a supervisor of the monitored subject.

It has been described how at least one sensor 410 is adapted to monitor the subject performing the intellectual task. Here, the sensor(s) 410 comprises a video camera for monitoring a face of the subject performing the intellectual task. The sensor may also be formed in the computer system 401, e.g. for monitoring characteristics of user inputs received at the input user interface 403.

Whilst the user terminal has been described in the context of a clinician reviewing medical image, the concepts may be adapted for use in other settings, e.g. in factories, power plants, warehouses and the like.

For example, the user terminal may enable a subject to control settings of a power plant, and may be adapted to prevent a user from modifying such settings if an output indicator indicates that their relative cognitive capability is below a predetermined threshold. This would help prevent changes to a power plant being made by a subject whilst they are too tired or not paying sufficient attention, thereby improving a safety of operating the power plant.

In yet another example, the overall concept may be adapted for use in a vehicle or automobile, such as a car. The user interface may be the driving interface (e.g. pedals and steering wheel). The monitoring system may be adapted to perform one or more actions in response to the output indicator indicating that the subject's relative cognitive capability is below a predetermined threshold. Example actions include: slowing down the vehicle, e.g. applying the brakes, limiting a maximum speed of the vehicle; entering a self-driving mode; turning on the hazard lights/flashers and so on. As before, different actions may be associated with different predetermined thresholds. In embodiments, actions may be grouped, and different groups of actions are associated with different predetermined thresholds.

Other adaptations for the envisaged concept will be apparent to the skilled person.

Suitable machine-learning algorithms for being employed in the present invention will be readily apparent to the skilled person. Examples of suitable machine-learning algorithms include decision tree algorithms and artificial neural networks.

Artificial neural networks or, simply, neural networks, will be familiar to those skilled in the art. In brief, a neural network is a type of machine-learning model that can be used to process input data to produce output data, such as predicting the probability of a certain scenario occurring based on the input data.

The structure of a neural network is inspired by the human brain. Neural networks are comprised of layers, each layer comprising a plurality of neurons. Each neuron comprises a mathematical operation. In the process of processing input data, the mathematical operation of each neuron is performed on the input data to produce a numerical output, and the outputs of each layer in the neural network are fed into the next layer sequentially. The final layer provides the output.

Methods of training a neural network are well known. Typically, a training set of data is provided, formed of training input data and corresponding training output data. The training input data is processed by the neural network to produce example output data. The example output data is compared to the training output data to determine an accuracy of the neural network (e.g. by using a loss function). The neural network, and in particular the mathematical operations of the neurons, are modified based on the determined accuracy in an effort to improve the accuracy of the neural network (e.g. minimize the loss function). Known methods of modifying the neural network include gradient descent, backpropagation algorithms and so on.

The skilled person would be readily capable of developing a processing system for carrying out any previously described method. Thus, each step of the flow chart may represent a different action performed by a processing system, and may be performed by a respective module of the processing system.

A processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a computer. Thus, different portions, lines or blocks of code of a program according to an embodiment may be executed by a processor/computer to perform any herein described method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, the term "adapted to" is intended to be equivalent to the term "configured to". Any reference signs in the claims should not be construed as limiting the scope.

The invention claimed is:

1. A method of generating an output indicator of a relative cognitive capability of a monitored subject carrying out an intellectual task of reading a medical image through a computing system, the method comprising:
    sensing with at least one sensorobtaining at least one physiological signal of a subject, wherein the at least sensor includes at least one of a pulse oximeter, a blood pressure cuff, electroencephalogram and an electrocardiogram, the at least one physiological signal includes a numerical measure of a pulse rate, a blood pressure, a brain activity and a heart rate in response to the intellectual task, and the at least one sensor generates at least one output indicative of the at least one sensed physiological signal;
    processing the at least one output using a first machine-learning algorithm, to thereby generate a first intermediate indicator of either a factor able to impair a subject's relative cognitive capability or a characteristic affected by impairments to a subject's relative cognitive capability based on the numerical measure of the at least one physiological signal, wherein the first intermediate indicator includes a first numerical measure of at least one of a distraction level, an attention level, an emotional level and a fatigue level of the subject;
    processing the at least one output using a second, different machine-learning algorithm, to thereby generate a second, different intermediate indicator of either a factor able to impair a subject's relative cognitive capability or a characteristic affected by impairments to a-the subject's relative cognitive capability based on the numerical measure of the at least one physiological signal, wherein the second intermediate indicator includes a second numerical measure of the at least one of the distraction level, the attention level, the emotional level and the fatigue level of the subject; and
    processing the first and second intermediate indicators to thereby generate an output indicator of the subject's relative cognitive capability;
    detecting information entered into an input interface of the computing system during an event of the intellectual task may be inaccurate based on the at least one output of the at least one sensor;
    preventing the computing device from saving the entered information; and
    preventing the input interface of the computing device from receiving further user input.

2. The method of claim 1, wherein the step of processing the first and second intermediate indicators comprises processing the first and second intermediate indicators, using a third, different machine-learning algorithm, to generate an output indicator of a level of the subject's relative cognitive capability.

3. The method of claim 1, wherein the at least one sensor comprises at least two sensors, and the at least one output comprises at least one output from each sensor.

4. The method of claim 1, wherein the processing includes determining a weighted sum of the first and second intermediate indicators and passing the weighted sum through a sigmoid function.

5. The method of claim 1, wherein the first and second machine-learning algorithms are trained independently from one another.

6. The method of claim 1, wherein at least one of the first and second machine-learning algorithms includes one or more layers, each layer including a plurality of neurons, each neuron configured to perform an operation on input data to produce a numerical output, wherein an output of each of the one or more layers is an input of a subsequent layer, and a final layer provides at least one of the first and second intermediate indicators.

7. The method of claim 1, further comprising:
    processing the output indicator to determine whether the relative cognitive capability of the subject is below a predetermined threshold; and
    in response to determining that the relative cognitive capability of the subject is below the predetermined threshold, generating an alert.

8. The method of claim 7, wherein the step of generating an alert comprises generating a user perceptible output via a user interface.

9. TheA method of claim 1, further comprising:
    changing a flag of the input user interface of the computing system in response to the detecting.

10. The method of claim 1, further comprising:
    changing a state of the input user interface of the computing system in response to the detecting.

11. The method of claim 1, wherein the monitored subject is a clinician, and the intellectual task includes diagnosing subjects, wherein the first intermediate indicator or the second intermediate indicator is a measure in response to an intellectual task related to assessing the medical images.

12. A non-transitory computer readable medium storing instructions that, when executed by one or more processors, cause the one or more processors to:

sense with at least one sensor at least one physiological signal of a subject, wherein the at least one sensor includes at least one of a pulse oximeter, a blood pressure cuff, electroencephalogram and an electrocardiogram, the at least one physiological signal includes a numerical measure of a pulse rate, a blood pressure, a brain activity and a heart rate in response to the intellectual task, and the at least one sensor generates at least one output indicative of the at least one sensed physiological signal;

process, with an application specific integrated circuit (ASIC), the at least one output and generate a first intermediate indicator of either a factor able to impair a subject's relative cognitive capability or a characteristic affected by impairments to a subject's relative cognitive capability based on the numerical measure of the at least one physiological signal, wherein the first intermediate indicator includes a first numerical measure of at least one of a distraction level, an attention level, an emotional level and a fatigue level of the subject;

process, with the ASIC, the at least one output using a second, different machine-learning algorithm, and generate a second, different intermediate indicator of either a factor able to impair a subject's relative cognitive capability or a characteristic affected by impairments to the subject's relative cognitive capability based on the numerical measure of the at least one physiological signal, wherein the second intermediate indicator includes a second numerical measure of the at least one of the distraction level, the attention level, the emotional level and the fatigue level of the subject; and process, with the ASIC, the first and second intermediate indicators and generate an output indicator of the subject's relative cognitive capability based on a combination of the first and second intermediate indicators;

detect, with one or more processors, information entered into an input interface of the computing system during an event of the intellectual task may be inaccurate based on the at least one output of the at least one sensor, prevent the computing device from saving the entered information, and prevent the input interface of the computing device from receiving further user input.

13. The non-transitory computer readable medium of claim 12, wherein at least one of the first and second intermediate indicators indicate a change to a predetermined baseline level.

14. The non-transitory computer readable medium of claim 12, wherein at least one of the first and second intermediate indicators indicate a difference from a predetermined normal level.

15. A system for determining a relative cognitive capability of a monitored subject carrying out an intellectual task of reading a medical image, the system comprising:

at least one sensor configured to sense at least one physiological signal of a subject, wherein the at least one sensor includes at least one of a pulse oximeter, a blood pressure cuff, electroencephalogram and an electrocardiogram, the at least one physiological signal includes a numerical measure of a pulse rate, a blood pressure, a brain activity and a heart rate in response to the intellectual task, and the at least one sensor generates at least one output indicative of the at least one sensed physiological signal;

a neural network including at least one machine-learning algorithm, each of the at least one machine-learning algorithms including one or more layers, each of the one or more layers including a plurality of neurons, each of the plurality of neurons configured to perform an operation on input data to produce a numerical output, wherein an output of each of the one or more layers is an input of a subsequent layer, and a final layer provides at least one of a first intermediate indicator and a second intermediate indicator, wherein a first machine-learning algorithm is configured to process the at least one output and generate the first intermediate indicator of either a factor able to impair a subject's relative cognitive capability or a characteristic affected by impairments to a subject's relative cognitive capability based on the numerical measure of the at least one physiological signal, wherein the first intermediate indicator includes a first numerical measure of at least one of a distraction level, an attention level, an emotional level and a fatigue level of the subject;

wherein the second machine-learning algorithm is configured to process the at least one output using a second, different machine-learning algorithm, and generate the second intermediate indicator of either a factor able to impair a subject's relative cognitive capability or a characteristic affected by impairments to the subject's relative cognitive capability based on the numerical measure of the at least one physiological signal, wherein the second intermediate indicator includes a second numerical measure of the at least one of the distraction level, the attention level, the emotional level and the fatigue level of the subject, and one or more processors configured to generate an output indicator of the subject's relative cognitive capability based on a combination of the first and second intermediate indicators.

16. The system of claim 15, further comprising:

an input user interface adapted to receive a user input representing an outcome of an intellectual task performed by the subject; and at least one of the one or more processors adapted to flag the user input provided by the subject based on the output indicator.

17. The system of claim 15, further comprising:

an input user interface adapted to receive a user input representing an outcome of an intellectual task performed by a-the subject; and at least one of the one or more processor configured to determine whether a relative cognitive capability of the subject is below a predetermined threshold,; and, in response to determining that the relative cognitive capability of the subject is below the predetermined threshold, prevent the subject from providing a user input.

18. The system of claim 15, wherein at least one of the one or more processors is further configured to change a flag on an input user interface in response to determining the subject's cognitive capability is impaired.

19. The system of claim 15, wherein at least one of the one or more processors is further configured to change a state of an input user interface of the computing system to prevent entry of a user input corresponding to the reading of the medical image in response to determining the subject's cognitive capability is impaired.

20. The method of claim 15, further comprising:
an application specific integrated circuit (ASIC) including the neural network.

* * * * *